(12) United States Patent
Hamilton et al.

(10) Patent No.: US 9,328,231 B2
(45) Date of Patent: May 3, 2016

(54) COMPOSITE POLYMER

(71) Applicant: WEYERHAEUSER NR COMPANY, Federal Way, WA (US)

(72) Inventors: Robert T. Hamilton, Seattle, WA (US); Harshadkumar M. Shah, Bonney Lake, WA (US); Jeffrey J. Cernohous, Hudson, WI (US); Neil R. Ganlund, Columbia Heights, MN (US); David E. Fish, Bellevue, WA (US)

(73) Assignee: Weyerhaeuser NR Company, Federall Way, WA (US)

( * ) Notice: Subject to any disclaimer, the term of this patent is extended or adjusted under 35 U.S.C. 154(b) by 106 days.

(21) Appl. No.: 13/629,096

(22) Filed: Sep. 27, 2012

(65) Prior Publication Data
US 2013/0206036 A1 Aug. 15, 2013

Related U.S. Application Data

(60) Provisional application No. 61/598,855, filed on Feb. 14, 2012.

(51) Int. Cl.
| C08L 97/02 | (2006.01) |
| C08L 23/12 | (2006.01) |
| C08L 53/00 | (2006.01) |
| C08L 55/02 | (2006.01) |
| C08J 5/04 | (2006.01) |

(52) U.S. Cl.
CPC .............. *C08L 23/12* (2013.01); *C08J 5/045* (2013.01); *C08L 53/00* (2013.01); *C08L 55/02* (2013.01); *C08L 97/02* (2013.01); *C08L 2205/16* (2013.01)

(58) Field of Classification Search
None
See application file for complete search history.

(56) References Cited

U.S. PATENT DOCUMENTS

| 4,559,376 | A | * | 12/1985 | Kubat | C08L 1/02 524/13 |
| 5,474,722 | A | * | 12/1995 | Woodhams | B29C 47/0004 264/108 |
| 5,562,740 | A | * | 10/1996 | Cook et al. | 8/120 |
| 5,973,035 | A | * | 10/1999 | Medoff | A01N 25/34 523/129 |
| 6,270,883 | B1 | * | 8/2001 | Sears et al. | 428/292.1 |
| 6,743,507 | B2 | * | 6/2004 | Barlow et al. | 428/393 |
| 7,550,404 | B2 | | 6/2009 | Fisher et al. | |
| 2004/0220299 | A1 | | 11/2004 | Drabeck et al. | |
| 2005/0225009 | A1 | * | 10/2005 | Sain et al. | 264/328.18 |
| 2006/0199893 | A1 | | 9/2006 | Schrempf et al. | |
| 2008/0145637 | A1 | * | 6/2008 | Frank | 428/292.4 |
| 2010/0307702 | A1 | | 12/2010 | Mann et al. | |
| 2013/0206035 | A1 | * | 8/2013 | Hamilton et al. | 106/162.5 |
| 2013/0206036 | A1 | | 8/2013 | Hamilton et al. | |
| 2013/0206037 | A1 | * | 8/2013 | Hamilton et al. | 106/162.9 |
| 2013/0210964 | A1 | * | 8/2013 | Cernohous et al. | 524/14 |
| 2013/0210965 | A1 | * | 8/2013 | Hamilton et al. | 524/14 |

FOREIGN PATENT DOCUMENTS

JP 59080904 A 5/1984

OTHER PUBLICATIONS

Chemical Book (Mineral Oil), 2014.

* cited by examiner

*Primary Examiner* — Satya Sastri
(74) *Attorney, Agent, or Firm* — Weyerhaeuser Law Dept; Timothy M. Whalen

(57) ABSTRACT

A composition comprising 10 to 50 wt % wood pulp fiber and 45 to 85 wt % thermoplastic polymer wherein the average dispersion of the fibers within the thermoplastic polymer composition is equal to or greater than 90% as determined by the Dispersion Test. The pulp can be bleached chemical wood pulp fiber.

9 Claims, 8 Drawing Sheets

US 9,328,231 B2

COMPOSITE POLYMER

FIELD OF THE INVENTION

The present invention relates to polymeric composites that are derived from melt processing a polymeric matrix with chemical wood pulp fiber.

DETAILED DESCRIPTION

Figure 1:
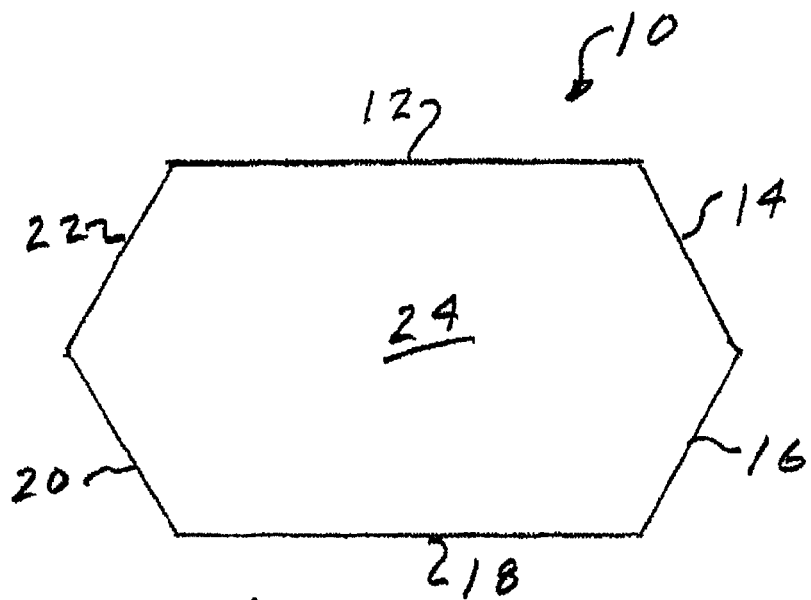
FIGS. 1-5 are diagrams of a particle used to manufacture the polymeric composite

The present invention is directed toward providing an economical means of producing composite polymeric materials which comprise wood pulp fiber and thermoplastic polymer. In an embodiment the wood pulp fiber is a chemical wood pulp fiber. In an embodiment the wood pulp fiber is a kraft chemical wood pulp fiber. In an embodiment the wood pulp fiber is a bleached wood pulp fiber. In an embodiment the wood pulp fiber is a bleached chemical wood pulp fiber. For simplicity the term "wood pulp fiber" will be used but it should be noted that bleached chemical wood pulp fiber has attributes not possessed by some of the other fibers.

The present invention can utilize a number of tree species as the source of the pulp fibers. Coniferous and broadleaf species and mixture of these can be used. These are also known as softwoods and hardwoods. Typical softwood species are various spruces (e.g., Sitka Spruce), fir (Douglas fir), various hemlocks (Western hemlock), tamarack, larch, various pines (Southern pine, White pine, and Caribbean pine), cypress and redwood or mixtures of same. Typical hardwood species are ash, aspen, cottonwood, basswood, birch, beech, chestnut, gum, elm, eucalyptus, maple oak, poplar, and sycamore or mixtures thereof.

The use of softwood or hardwood species may depend in part on the fiber length desired. Hardwood or broadleaf species have a fiber length of 1-2 mm. Softwood or coniferous species have a fiber length of 3.5 to 7 mm. Douglas fir, grand fir, western hemlock, western larch, and southern pine have fiber lengths in the 4 to 6 mm range. Pulping and bleaching and dicing may reduce the average length because of fiber breakage.

Cellulose wood pulp fibers differ from wood fibers because the lignin has been removed and some of the hemicellulose has been removed. These materials stay in wood fibers. The amount of material remaining in a wood pulp fiber will depend upon the process of making it.

In a mechanical pulp the fibers are separated by mechanical means, such as grinding, and the process may include steaming and some pre-chemical treatment with sodium sulfite. The lignin is softened to allow the fibers to part. Much of the lignin and hemicellulose as well as the cellulose remains with the fiber. The yield, the percentage of material remaining after pulping, is high. The fiber can be bleached with peroxide but this process does not remove much of the material.

In chemical pulping, the lignin is removed during a chemical reaction between the wood chips and the pulping chemical. Hemicelluloses may also be removed during the reaction. The amount of material being removed will depend upon the chemicals being used in the pulping process. The kraft or sulfate process removes less material than the sulfite process or the kraft process with a prehydrolysis stage. The yield is higher in the kraft process than in the sulfite process or kraft with prehydrolysis. The latter two process have a product with a high percentage of cellulose and little hemicellulose or lignin.

Bleaching chemical wood pulp removes more of the lignin and hemicellulose.

In the manufacture of pulp woody material is disintegrated into fibers in a chemical pulping process. The fibers can then optionally be bleached. The fibers are then combined with water in a stock chest to form a slurry. The slurry then passes to a headbox and is then placed on a wire, dewatered and dried to form a pulp sheet. Additives may be combined with the fibers in the stock chest, the headbox or both. Materials may also be sprayed on the pulp sheet before, during or after dewatering and drying. The kraft pulping process is typically used in the manufacture of wood pulp.

There is a difference between wood fiber and wood pulp fiber. A wood fiber is a group of wood fibers held together by lignin. The lumens of the wood pulp fibers collapse during the drying process. The dried chemical wood pulp fibers are flat. The lumens of each of the wood fibers in the wood fiber bundle remain open. The flat wood pulp fibers are more flexible than wood fibers.

Cellulosic wood pulp fibers can be in the form of commercial cellulosic wood pulps. The pulp is typically delivered in roll or baled form. The pulp sheet has two opposed substantially parallel faces and the distance between these faces will be the thickness of the particle. A typical pulp sheet can be from 0.1 mm to 4 mm thick. In some embodiments the thickness may be from 0.5 mm to 4 mm.

The wood pulp sheet is formed into particles for the ease of metering and combining with the thermoplastic polymer.

The fiber sheet, and the particles, can have a basis weight of from 12 g/m$^2$ (gsm) to 2000 g/m$^2$. In one embodiment the particles could have a basis weight of 600 g/m$^2$ to 1900 g/m$^2$. In another embodiment the particles could have a basis weight of 500 g/m$^2$ to 900 g/m$^2$. For a paper sheet one embodiment could have a basis weight of 70 gsm to 120 gsm. In another embodiment a paperboard could have a basis weight of 100 gsm to 350 gsm. In another embodiment a fiber sheet for specialty use could have a basis weight of 350 gsm to 500 gsm.

Pulp additives or pretreatment may also change the character of the particle. A pulp that is treated with debonders will provide a looser particle than a pulp that does not have debonders. A looser particle may disperse more readily in the material with which it is being combined. The thickness of the pulp sheet is one factor that can determine the thickness of the particle.

In one embodiment the particle has a hexagonal shape, one embodiment of which is shown in FIG. 1. The hexagon can be of any type from fully equilateral to fully asymmetric. If it is not equilateral, the major axis may be from 4 to 8 millimeters (mm) and the minor axis may be from 2 to 5 mm. Some of the sides of the hexagon may be of the same length and some or all of the sides may be of different lengths. The circumference or perimeter of the hexagon may be from 12 mm to 30 mm and the area of the upper or lower face 24 or 26 of the particle may be from 12 to 32 mm². In one embodiment the particles could have a thickness of 0.1 to 1.5 mm, a length of 4.5 to 6.5 mm, a width of 3 to 4 mm and an area on one face of 15 to 20 mm². In another embodiment the particles could have a thickness of 1 to 4 mm, a length of 5 to 8 mm, a width of 2.5 to 5 mm and an area on one face of 12 to 20 mm².

Two examples of a hexagonally shaped particle are shown.

Figure 2:
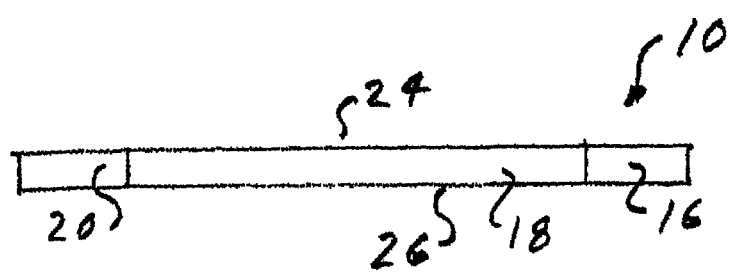
Figure 3:
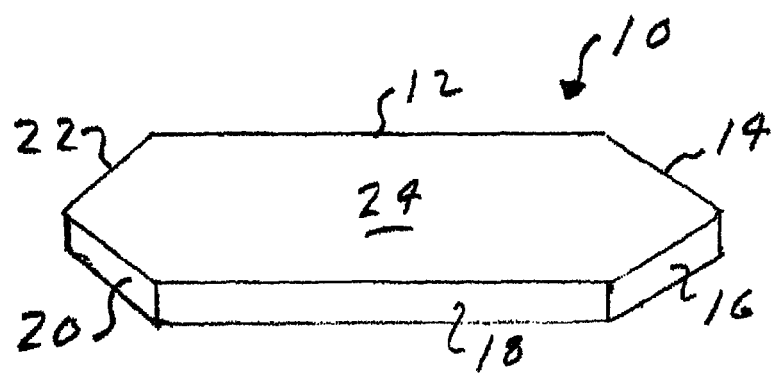

In FIGS. 1-3, particle 10 is hexagon shaped and has two opposed sides 12 and 18 which are equal in length and are longer than the other four sides 14, 16, 20 and 22. The other four sides 14, 16, 20 and 22 may be the same length, as shown, or the four sides may be different lengths. Two of the sides, one at each end such as 14 and 20 or 14 and 22 may be the same length, and the other two at each end, 16 and 22 or 16 and 20, may be the same length or have different lengths. In each of these variations, the sides 10 and 18 may the same length or of different lengths. The edges of the particles may be sharp or rounded.

The distance between the top 24 and bottom 26 of particle 10 may be from 0.1 mm to 4 mm.

Figure 4:
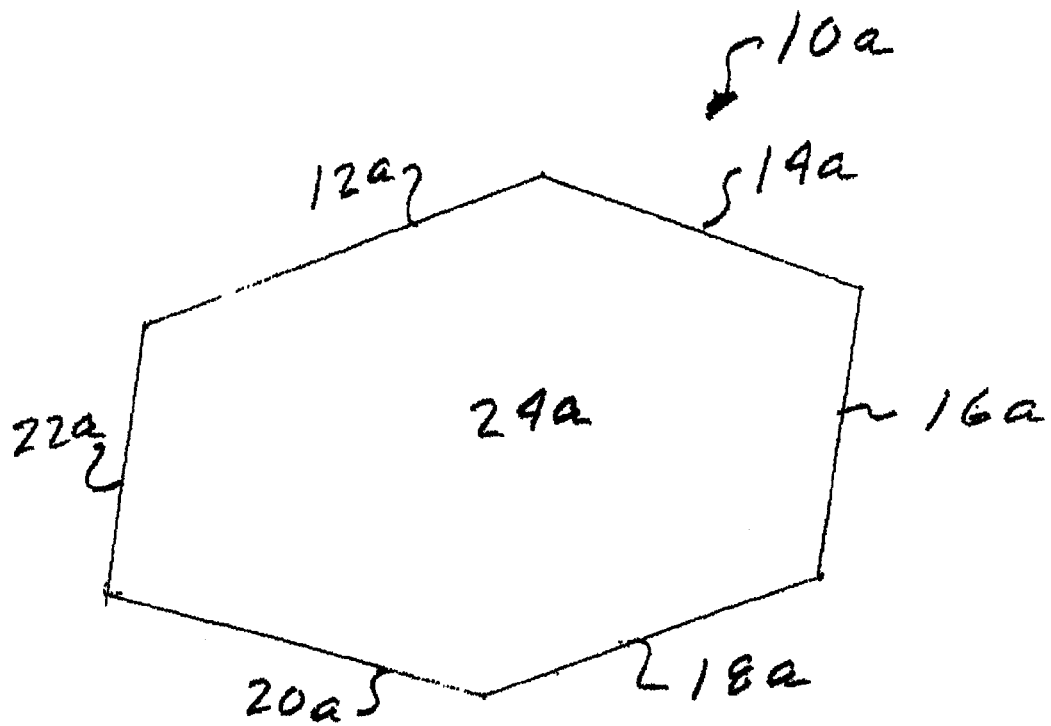
Figure 5:
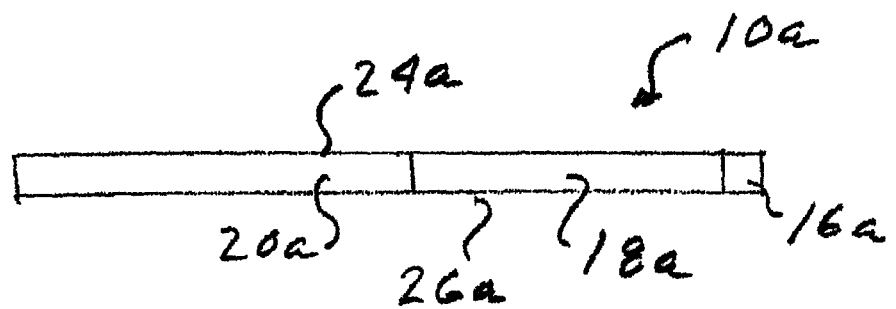

FIGS. 4 and 5 illustrate an embodiment in which each of the six sides the hexagon is of a different length. The embodiment shown is illustrative and the order of the lengths of the sides and size of the lengths of the sides can vary.

Particles of the shape, size and basis weight described above can be metered in weight loss and volumetric feeder systems well known in the art.

The alignment of the fibers within the particle can be parallel to the major axis of the hexagon or perpendicular to the major axis of the hexagon or any orientation in between.

The hexagonal particles can be formed on a Henion dicer, but other means could be used to produce a hexagonal particle.

Other forms of pulp particles may also be used. The ease of addition may depend on the shape of the particle.

The polymeric matrix functions as the host polymer and is a component of the melt processable composition including the chemical wood pulp feedstock. Melt processing is used to combine the polymer and chemical wood pulp fiber. In melt processing the polymer is heated and melted and the chemical wood pulp fiber is combined with the polymer. During this process the fibers are singulated.

The polymer is thermoplastic.

A wide variety of polymers conventionally recognized in the art as suitable for melt processing are useful as the polymeric matrix. The polymeric matrix substantially includes polymers that are sometimes referred to as being difficult to melt process, especially when combined with an interfering element or another immiscible polymer. They include both hydrocarbon and non-hydrocarbon polymers. Examples of useful polymeric matrices include, but are not limited to high density polyethylene (HDPE), low density polyethylene (LDPE), linear low density polyethylene (LLDPE), polypropylene (PP)), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, Liquid Crystal Polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters or combinations thereof. In certain embodiments, the most suitable polymeric matrices are polyolefins.

Polymeric matrices that are derived from recycled plastics are also applicable as they are often lower cost. However, because such materials are often derived from materials coming from multiple waste streams, they may have vastly different melt rheologies. This can make the material very problematic to process. The addition of cellulosic feedstock to a recycled polymer matrix should increase the melt viscosity and reduce overall variability, thus improving processing.

In some embodiments the following thermoplastic polymers may be used: Biopolymers such as polylactic acid (PLA), cellulose acetate, cellulose propionate, cellulose butyrate; polycarbonates, polyethylene terephthalate, polyolefins such as polyethylene, high density polyethylene, low density polyethylene, linear low density polyethylene, polypropylene, polystyrene, polystyrene copolymers such as acrylonitrile-butadiene-styrene copolymer (ABS), styrene block copolymers, polyvinyl chloride (PVC), and recycled plastics.

The thermoplastic polymer may be selected from the group consisting of biopolymers, polylactic acid, cellulose acetate, cellulose propionate, cellulose butyrate; polycarbonates, polyethylene terephthalate, polyolefins, polyethylene, high density polyethylene, low density polyethylene, linear low density polyethylene, polypropylene, polystyrene, polystyrene copolymers, acrylonitrile-butadiene-styrene copolymer, styrene block copolymers, polyvinyl chloride, and recycled plastics.

In one embodiment, the chemical wood pulp feedstock is melt processed with an incompatible polymeric matrix (e.g., polyolefin). In another embodiment, the chemical wood pulp feedstock is melt processed with a compatible polymeric matrix (e.g., modified cellulosic polymers). For example, it has been found that when the chemical wood pulp feedstock of this invention is melt processed with cellulose propionate (Tenite™ 350E), the resulting composite has excellent fiber dispersion and mechanical properties.

The present invention also contemplates the use of compatibilizing agents in the composite formulation. Compatibilizing agents are typically used to improve interfacial wetting of fillers with a polymer matrix. Addition of coupling agents or compatibilizers often improves the mechanical properties of the resulting composite material. The present invention utilizes compatibilizing agents to improve wetting between the chemical wood pulp fiber of this invention and the polymer matrix as is known conventionally. However, we have also found that addition of a compatibilizing agent improves dispersion of the chemical wood pulp feedstock of this invention with some polymers. Compatibilizing agents and coupling agents are sometimes used interchangeably even though they perform differently to provide compatibility between the two materials.

Preferred compatibilizing agents for use with polyolefins are polyolefin-graft-maleic anhydride copolymers. In one embodiment, the polymer matrix and cellulosic feedstock is melt processed with a polyolefin-graft-maleic anhydride copolymer. Commercially available compatibilizing agents of this invention include those sold under the tradenames Polybond™ (Chemtura), Exxelor™ (Exxon Mobil), Fusabond™ (DuPont), Lotader™ (Arkema), Bondyram™ (Maroon), Integrate (Equistar). The polymeric matrix may contain one or more fillers in addition to the chemical wood pulp feedstock. The polyolefin in the graft copolymer will be the same as the polyolefin used as the polymer in the polymer matrix. For example polyethylene-graft-maleic anhydride would be used with polyethylene and polypropylene-graft-maleic anhydride would be used with polypropylene.

In one embodiment, amounts of about 5-10%, and in another 0.2-5% of the compatibilizing agent is incorporated into composite formulations and melt processable compositions.

Fillers and fibers other than chemical wood pulp fibers may be added to the fiber/polymer blend to impart desirable physical characteristics or to reduce the amount of polymer needed for a given application. Fillers often contain moisture and therefore reduce efficacy of a compatibilizer present in a polymeric matrix. Non-limiting examples of fillers and fibers include wood flour, natural fibers other than chemical wood pulp fiber, glass fiber, calcium carbonate, talc, silica, clay, magnesium hydroxide, and aluminum trihydroxide.

In another aspect of the invention, the melt processable composition may contain other additives. Non-limiting examples of conventional additives include antioxidants, light stabilizers, fibers, blowing agents, foaming additives, antiblocking agents, heat stabilizers, impact modifiers, biocides, flame retardants, plasticizers, tackifiers, colorants, processing aids, lubricants, compatibilizers, and pigments. The additives may be incorporated into the melt processable composition in the form of powders, pellets, granules, or in any other extrudable or compoundable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The composite polymers of this invention have wood pulp fibers uniformly dispersed within a thermoplastic polymeric matrix. The wood pulp fiber is first dispersed in a thermoplastic polymeric matrix in which wood pulp fiber is 65 to 90 weight % of the total composition.

There are problems associated with uniformly dispersing chemical wood pulp fibers throughout a polymer matrix. The fibers are initially in a dried pulp sheet. The drying collapses the pulp fibers. The drying also causes the pulp fibers to bond together through hydrogen bonds. The hydrogen bonds must be broken in order to obtain substantially individual fibers. Some of the fibers will remain bonded. These are called knots or knits depending on the size. There will usually be a few knots and knits remaining after breaking the hydrogen bonds between fibers.

There are also problems associated with providing the chemical wood pulp fiber at levels of 65 weight % or higher of the total weight of the fiber/polymer mix. The smaller amount of polymer means it is more difficult to disperse the fiber in the polymer matrix. The fiber/polymer mix becomes more viscous as the amount of fiber increases and it is therefore more difficult to move the fibers within the matrix to provide dispersion. The purpose is to have very few fiber clumps In one embodiment, the wood pulp feedstock of this invention is produced by mechanically dicing a wood pulp sheet material. In one embodiment, the wood pulp feedstock is diced into a hexagonal shape that is conducive for use with conventional feeding equipment. In other embodiments the shapes may be triangular, rectangular or pentagon shaped particles. The composites of this invention are produced by melt processing a polymeric matrix with chemical wood pulp feedstock. In one embodiment, the chemical wood pulp feedstock is uniformly dispersed within the polymeric matrix after melt processing.

The present invention is directed at a solution to providing an economical means of producing composite materials which contain well dispersed chemical wood pulp fibers. This is achieved by utilizing a wood pulp feedstock that has increased bulk density and is capable of being fed into melt processing equipment using conventional feeding technology. The composites of this invention have wood pulp fibers well dispersed within a polymeric matrix.

The hydrogen bonded cellulose wood pulp fibers are then dispersed in the polymer. One method is to make a master batch which is fiber rich having 65 to 85 weight % of cellulose wood pulp fiber and 15 to 35 weight % polymer. Part of the polymer can be a compatibilizer if one is needed.

The initial addition of the cellulose pulp fiber to the polymer is a two step operation.

In the first step the pulp particles are combined and mixed with the polymer in a mixing operation. The mixing can occur in a thermokinetic mixer or a Gelimat mixer, The amount of chemical cellulose wood pulp fiber in the material is 65 to 85 weight % and the amount of polymer is 15 to 35 weight %. If a compatibilizer is used then the amount of polymer will be reduced by the amount of compatibilizer. If 5 weight % compatibilizer is used then the amount of polymer will be reduced by 5 weight %. Nonpolar polymer, such as olefins, would use a compatibilizer. Typical compatibilizers are graft copolymers such as maleic anhydride polypropylene or maleic anhydride polyethylene. If polypropylene is the polymer then up to 2 weight % antioxidant will also be used. In one embodiment 0.5 wt % antioxidant would be used. The fiber and polymer will exit the thermokinetic mixer as a fluffy material.

Figure 6:
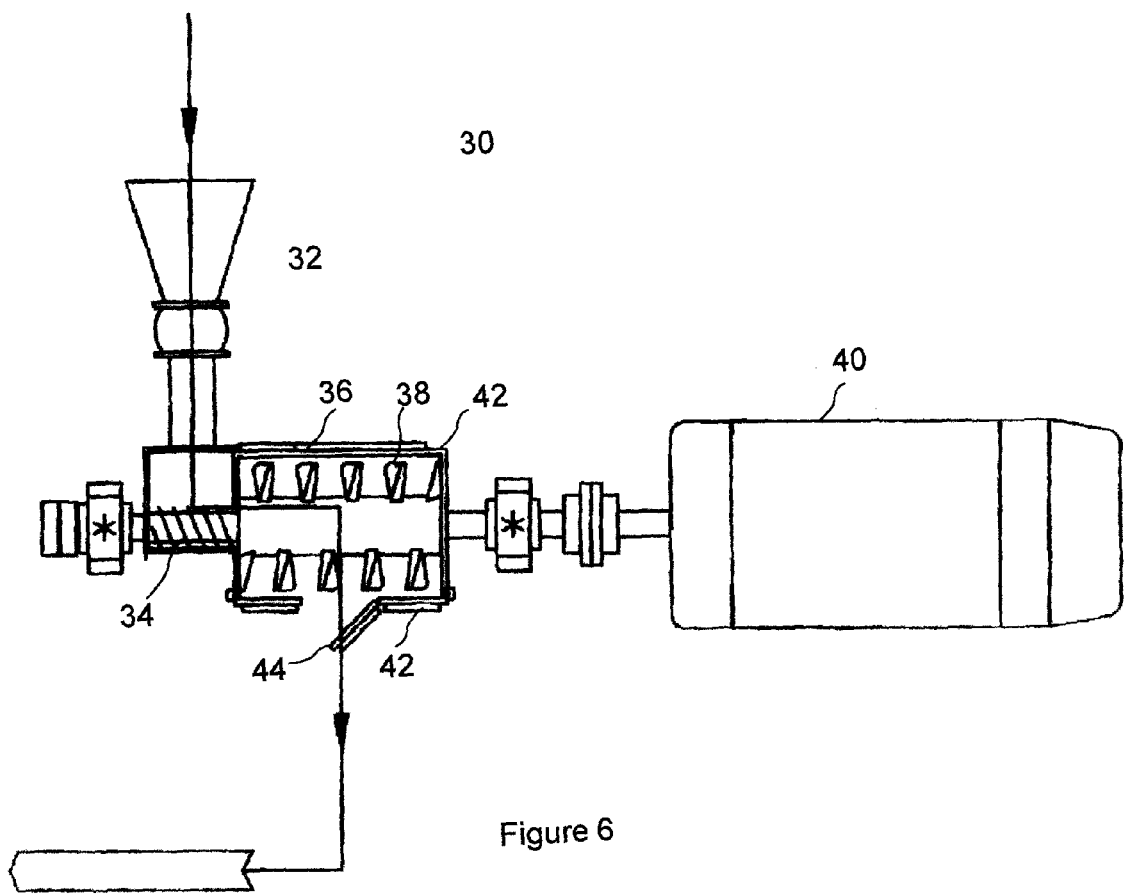
FIG. 6 is a diagram of a mixer.

A mixer 30 is shown in FIG. 6. The mixer 30 has a hopper 32 through which the materials are fed. The materials are carried by a screw feeder 34 into the mixing chamber 36 in which the blades 38 are rapidly rotated by motor 40. The blades 38 rotate through the mix and the centrifugal force created by the blades 38 moves the material outwardly against the mixing chamber wall 42. The frictional heat melts the polymeric materials, the polymer and the compatibilizer, and mixes the fiber with the polymer. After mixing the polymer is removed from the mixing chamber 36 through door 44.

Another method that can be used in the first step is a twin screw extruder with the die plate opened. The twin screw extruder has an open die plate on the exit end so the flow of material from the extruder will not be hindered. The amounts of fiber, polymer and compatibilizer is the same as described above. The material will exit the twin screw extruder as a lumpy material. The twin screw mixer and its operation is described in more detail below.

The problems to be solved are providing the fibers in a polymer matrix in a substantially individual form and metering the fibers into the polymer in a substantially uniform amount so the wood pulp fiber/composite will have wood pulp fibers substantially uniformly dispersed throughout the composite. The present invention carries the diced particles of chemical wood pulp taken from the wood pulp sheet and meters them into the polymer and substantially singulates the wood pulp fibers while mixing the wood pulp with the polymer.

In another embodiment, oil, such as mineral oil, may be added to the composite ingredients. In an embodiment the amount of mineral oil may be from 0.1 to 5 weight % of the total weight of the materials in the composite polymer materials. In an embodiment the amount of mineral oil may be from 0.1 to 2% of the total weight of the materials in the composite polymer materials. In an embodiment the amount of mineral oil may be from 1 to 2% of the total weight of the materials in the composite polymer materials. In an embodiment the amount of mineral oil may be from 1 to 1.5% of the total weight of the materials in the composite polymer materials. In an embodiment the amount of mineral oil may be 1.15% of the total weight of the materials in the composite polymer materials. The mineral oil increases the through-put of the composite through the extruders which may be used in the formation of the polymer and is believed to aid in the dispersion of the fibers in the composite.

Mineral oil is a viscous oil having a specific gravity of from 0.8 to 0.9. It can be clear, colorless and odorless. In an embodiment the mineral oil is a standard white mineral oil. In an embodiment the mineral oil is Drakol 600, CAS number 8042-47-5.

The mineral oil is added in the first master batch mixer and may be added in subsequent mixers. It is added with the pulp particles and the thermoplastic polymer and aids in the mixing of the materials and the speed of the process.

Figure 10:
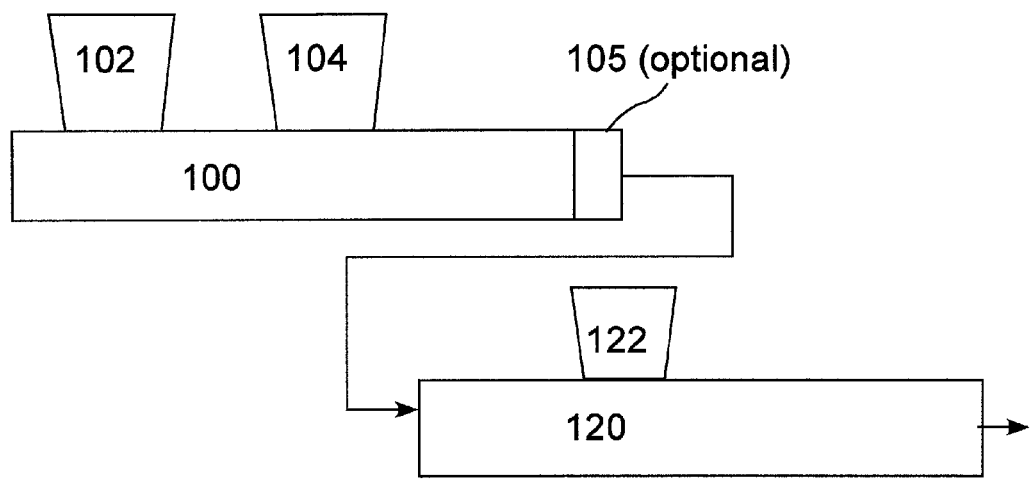
FIG. 10 is a diagram of an embodiment of apparatus and process for manufacturing a polymeric composite having a chemical wood pulp fiber content of 50 weight % or less.

In FIG. 10, the bleached chemical wood pulp fiber particles 24 or 24a enter twin screw extruder 100 through hopper 102. Polymer pellets also enter the twin screw extruder 100 through hopper 104. The hopper 104 may be before or after hopper 102. The wood pulp fiber particles and the polymer pellets may enter the twin screw extruder through the same hopper.

In one embodiment the twin screw extruder has an open die face. In another embodiment the twin screw extruder has a partially open die face by using a restrictor 105. The partial opening 106 may be any shape. In one embodiment the opening has an area that is 20 to 80% of the area of the open die face. In another embodiment is has an area that is 40 to 60% of the total area of the open die face. The partial open die face aids in the dispersion of the fibers in the polymer.

Figure 11:
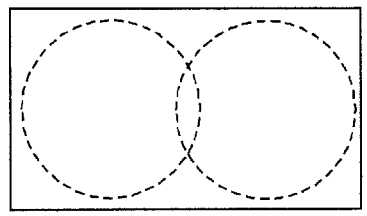
FIG. 11 is a cross-sectional view of the open face of the first twin screw mixer.

One embodiment of this die face is shown in FIG. 11. In this embodiment the transition from the area of the die face to the area of the opening is gradual. The upper and lower faces 107 and 108 of the restrictor 105 extend inwardly to constrict the flow of material toward the opening 106 to provide an opening that has less height than the open die face and the side faces 109 and 110 extend outwardly to provide an opening that is wider than the open die face. The restrictor withstands the pressure of the material being pushed through the extruder and may be a single machined part.

Figure 12:
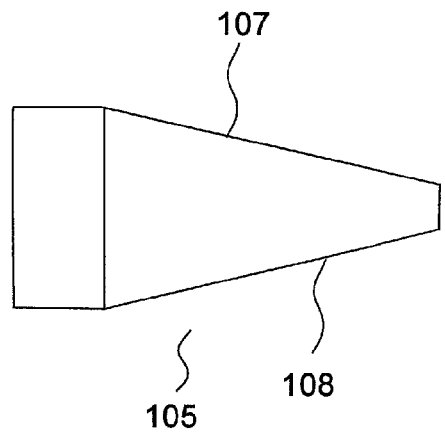
FIG. 12 is a side view of the restrictor for the first twin screw mixer.
Figure 13:
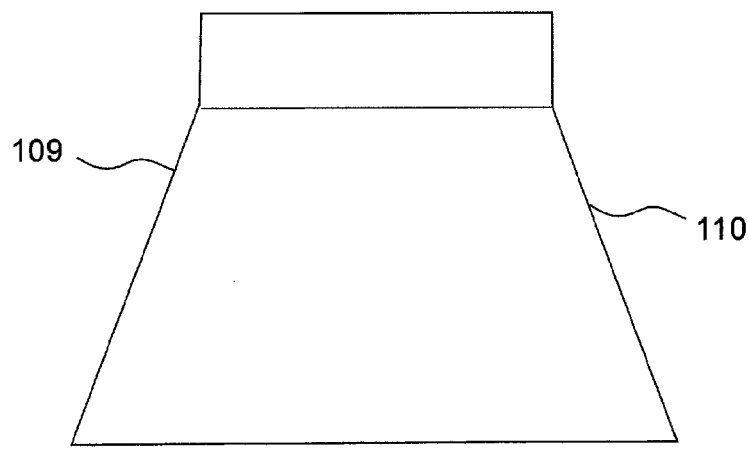
FIG. 13 is a front view of the restrictor for the first twin screw mixer.
Figure 13:
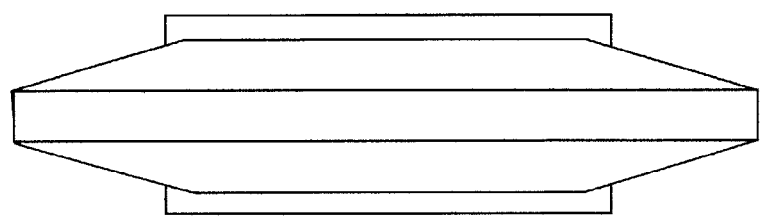

Another embodiment is shown in FIG. 12. The opening is divided into several openings 111. Again in one embodiment the opening has an area that is 20 to 80% of the area of the open die face. In another embodiment is has an area that is 40 to 60% of the total area of the open die face.

The amount of bleached chemical wood pulp fiber added to the polymer in the twin screw extruder is 65 to 85 weight % of the total weight of fiber, polymer and additives.

The first stage embodiments are the same for both the master batch composite in which 65 weight % to 85 weight % of the material is fiber and for the let-down composite in which 10 weight % to 50 weight % of the material is fiber.

The present invention is also directed to a solution to providing an economical means of producing composite polymeric materials which include 10 to 50 weight percent chemical wood pulp fiber. In one embodiment the pulp fibers are uniformly dispersed within the polymeric matrix.

In one embodiment the chemical wood pulp fiber is a bleached chemical wood pulp fiber. There are reasons for using a bleached chemical wood pulp fiber instead of an unbleached wood pulp fiber.

One reason is color. A bleached chemical wood pulp fiber is substantially all cellulose and hemicellulose. Cellulose and hemicellulose have no native color so they will impart little or no color to a composite. On the other hand, unbleached fibers such as natural fibers like kenaf or whole wood fibers have up to 50% lignin and other compounds which can be colored in their native state or will become colored when heated to thermoplastic processing temperatures. A composite with unbleached, natural or whole wood fibers would become colored, probably a dark brown color.

Another reason is odor. Cellulose has no odor so a composite with bleached wood pulp fibers has very little odor contributed by the cellulose. Lignin and other components in unbleached fibers have strong characteristic odors when melt processed, imparting a strong odor to the resulting composite, limiting its use in enclosed areas such as the interior of an automobile An embodiment for a noncompatible polymer may contain the following ingredients:

| | | | | Additive type | | |
|---|---|---|---|---|---|---|
| Type % fiber | Fiber Wt % | Polymer Wt. % | Additives Wt. % | Compatibilizer Wt. % | Anti-oxidant Wt % | Mineral Oil Wt. % |
| 85 | 85 | 7.2 | 7.8 | 5.7 | 0.6 | 1.5 |
| 70 | 70 | 23.6 | 6.4 | 4.7 | 0.5 | 1.2 |
| 65 | 65 | 29 | 6 | 4.4 | 0.5 | 1.1 |
| 55 | 55 | 40 | 5 | 3.7 | 0.4 | 0.9 |
| 50 | 50 | 45.4 | 4.6 | 3.4 | 0.4 | 0.9 |
| 46 | 46 | 49.8 | 4.2 | 3.1 | 0.3 | 0.8 |
| 45 | 45 | 50.9 | 4.1 | 3 | 0.3 | 0.8 |
| 40 | 40 | 56.3 | 3.7 | 2.7 | 0.3 | 0.7 |
| 36 | 36 | 60.7 | 3.3 | 2.4 | 0.3 | 0.6 |
| 35 | 35 | 61.8 | 3.2 | 2.35 | 0.25 | 0.6 |
| 30 | 30 | 67.3 | 2.7 | 2 | 0.2 | 0.5 |
| 26 | 26 | 71.6 | 2.4 | 1.75 | 0.2 | 0.45 |
| 25 | 25 | 72.7 | 2.3 | 1.7 | 0.2 | 0.4 |
| 20 | 20 | 78.2 | 1.8 | 1.3 | 0.15 | 0.35 |
| 16 | 16 | 82.5 | 1.5 | 1.1 | 0.1 | 0.3 |
| 15 | 15 | 83.6 | 1.4 | 1 | 0.1 | 0.3 |
| 10 | 10 | 89.1 | 0.9 | 0.7 | >0.1 | >0.2 |
| 6 | 6 | 93.45 | 0.55 | 0.4 | >0.1 | 0.1 |

In the master batch the material will be further treated in a pellet mill, such as a California pellet mill, or a single screw extruder, such as a Bonnot single screw extruder.

Figure 7:
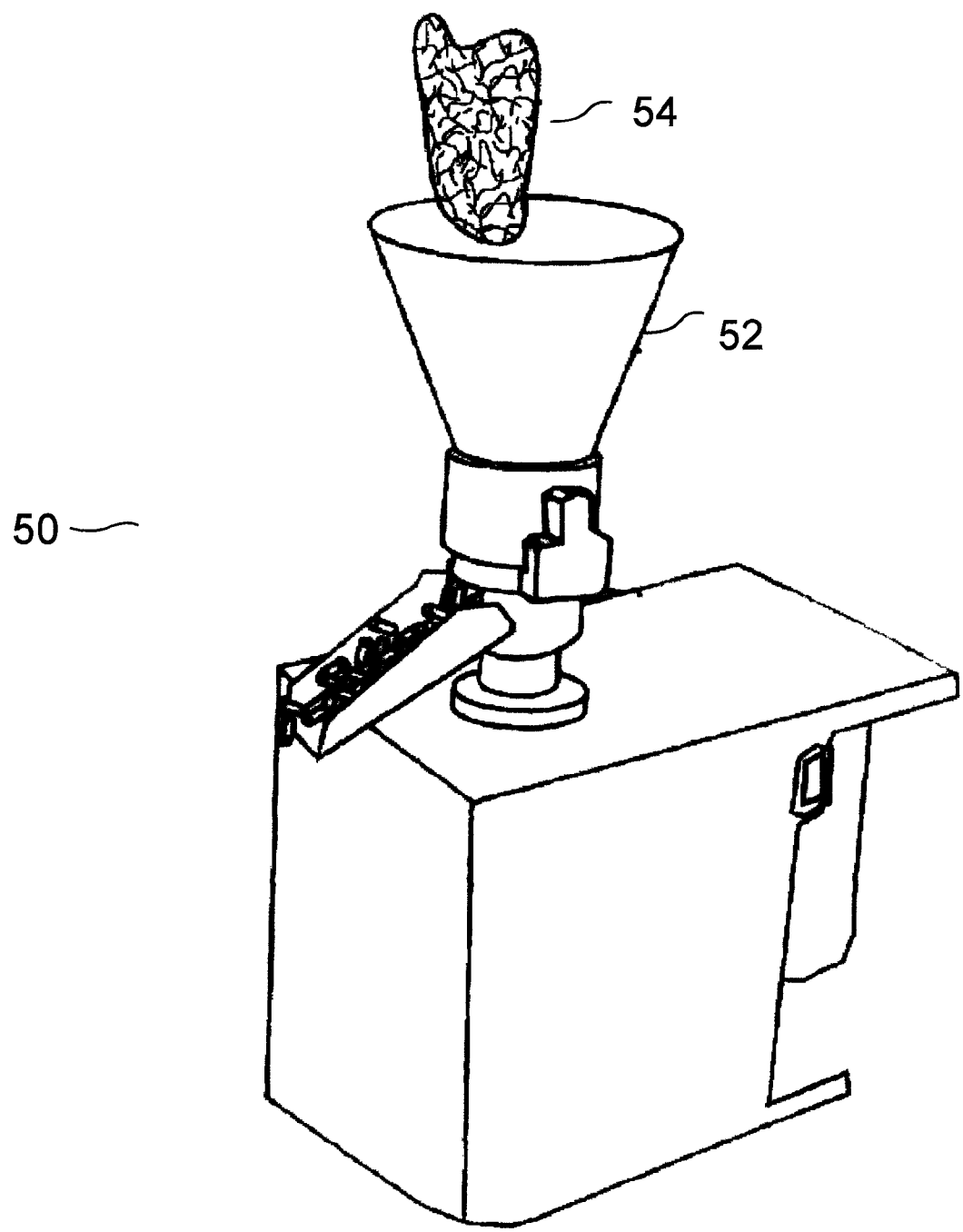
FIGS. 7 and 8 are diagrams of a pellet mill.
Figure 8:
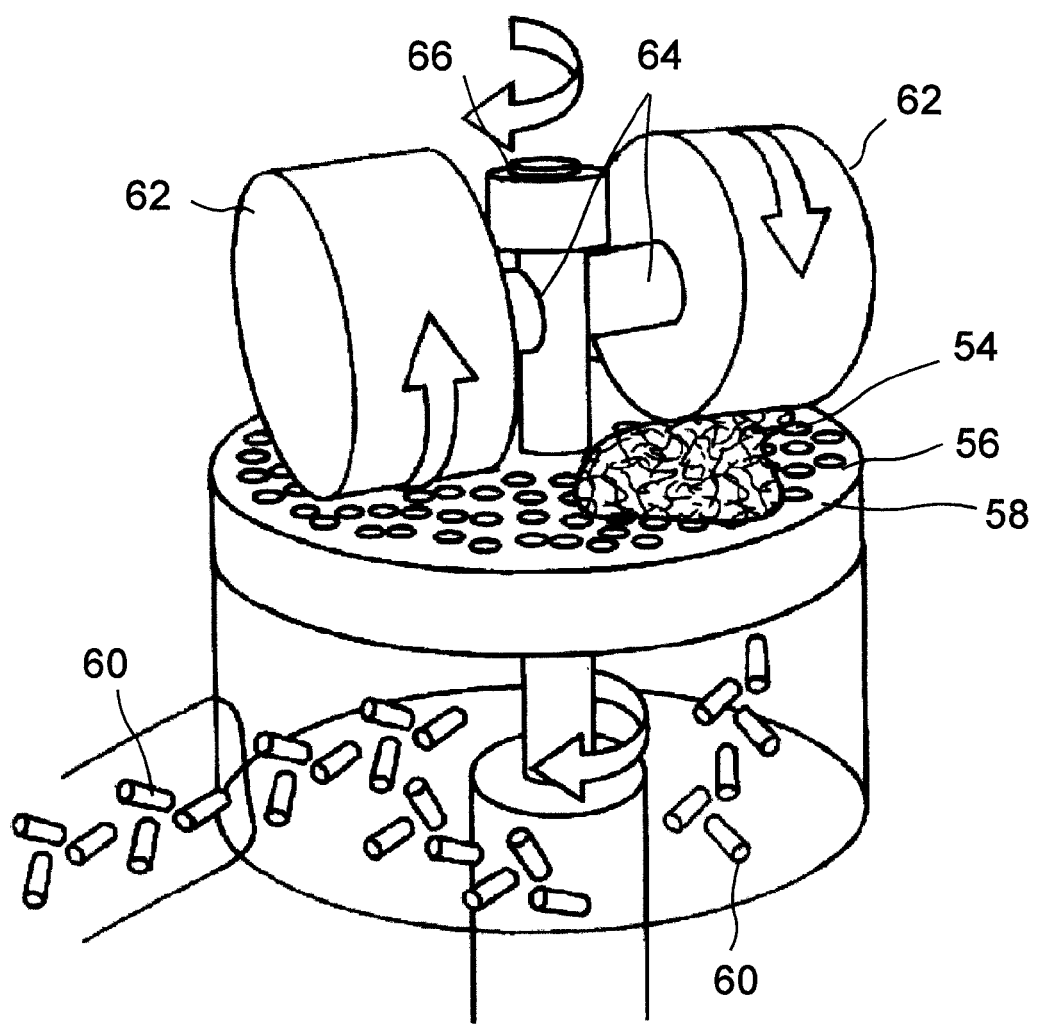

A laboratory version of a pellet mill is shown in FIGS. 7 and 8. The pellet mill 50 has a hopper 52 into which the fiber/polymer composite material 54 from the thermokinetic mixer or twin screw extruder or other mixer is transferred. The composite material 54 falls onto perforated plate 56. The apertures 58 on perforated plate 56 are the size of the diameter of the extruded pellets 60. A pair of wheels 62 forces the composite through the apertures 58 to form the pellets 60. The wheels 62 are mounted on axles 64. The axles 64 are mounted on a rotor 66. The rotor 66 is rotated by a motor (not shown) to rotate the wheels 62 around the perforated plate 56. The pellets 60 are removed from the apparatus and collected.

The tendency of the fibers at high fiber levels is to clump together. In the single screw extruder may be used to disperse the cellulose pulp fiber throughout the polymer. It was discovered that it was necessary to divert the flow of material through the extruder in order to obtain dispersion of the fiber. This is done by the placement of pins extending from the outer wall of the extruder into the extruder cavity. Material is forced from the apparatus through die holes to form extruded pellets. The material may have a tendency to block up behind the die plate and not pass through the die in an efficient manner. The addition of a wiper at the back of the die face moves the composite material through the die holes in a more efficient manner.

Figure 9:
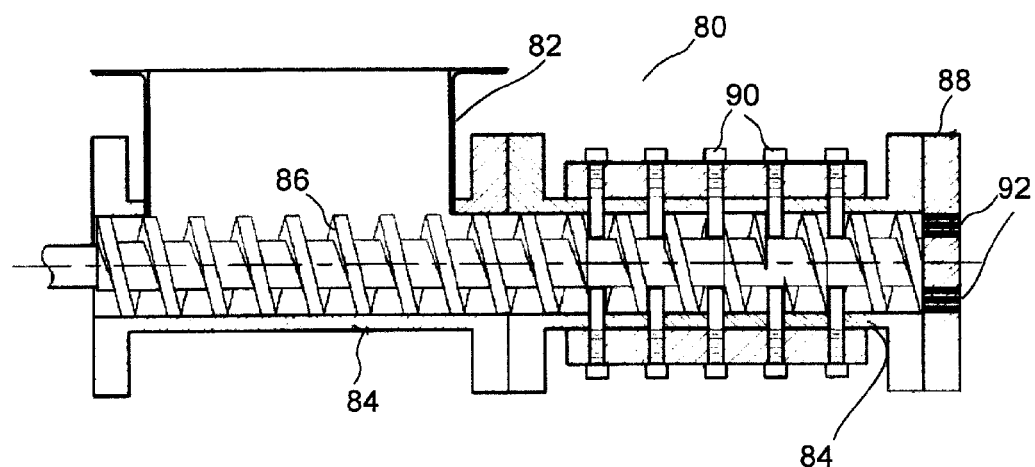
FIG. 9 is a diagram of a single screw extruder useful for manufacturing the present pellet.

A single screw extruder is shown in FIG. 9. The extruder 80 has a hopper 82 into which the fiber composite material from the mixer is placed. The hopper 82 connects with a barrel 84 and a screw 86 extending through the barrel 84. The screw 86 is rotated by a motor (not shown) and drives the material in the barrel toward the die plate 88. The design of the screw can put more or less pressure on the composite as it travels through the barrel. Pins 90 are placed along the barrel. The pins 90 may be moved inwardly or outwardly to divert the flow of material through the barrel and aid in the dispersion of the fibers within the polymer The die plate 86 has a number of apertures 92 through which the material passes to form strands which are optionally cut into pellets.

Figure 14:
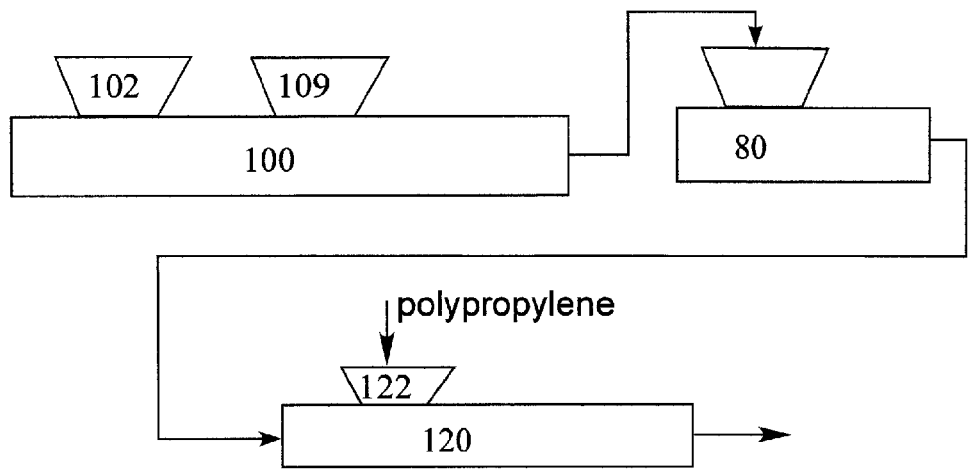
FIG. 14 is a diagram of another embodiment of apparatus and process for manufacturing a polymeric composite having a chemical wood pulp fiber content of 50 weight % or less.

In one embodiment the first twin screw mixer may be connected directly to the second single screw extruder and the material will pass directly from the first mixer to the second. The same motor may operate both. This is shown in FIG. 14.

The master batch pellets contain 65 to 85 weight % chemical wood pulp fiber and 15 to 35 weight % polymer.

FIG. 10 is an embodiment of a process and apparatus for manufacturing the polymeric composite having 50% or less chemical wood pulp fibers.

The material from the twin screw extruder is transferred to a second twin screw extruder 120 and additional polymer is added through hopper 122. Other components may be added as well, either to the throat or through a side-stuffer (not shown in figure). The polymer is the same as was used in the first twin screw extruder 100. The amount of polymer added is the amount required to provide the desired wood pulp fiber loading in the composite.

In a batch operation the first twin screw extruder may be used as the second twin screw extruder by cycling the composite material through the first twin screw extruder a second time and adding the additional polymer in this second pass through the extruder. In this operation the die face of the extruder would be changed from an open or partially open die face to a die face having die openings to form extrudate.

The additional additives may also be added in the second twin screw extruder.

The composite is extruded through the die openings in the die plate and cut to size.

The extrudate from the second twin screw extruder may be formed into pellets by an underwater pelletizer. It has been thought that an underwater pelletizer could not be used with pulp fiber because the fibers are hydrophilic. It has been found that an underwater pelletizer can be used and the moisture content of the fiber in the pellet is 1% or less. In some embodiments there is no deleterious effect due to water pickup.

Figure 15:
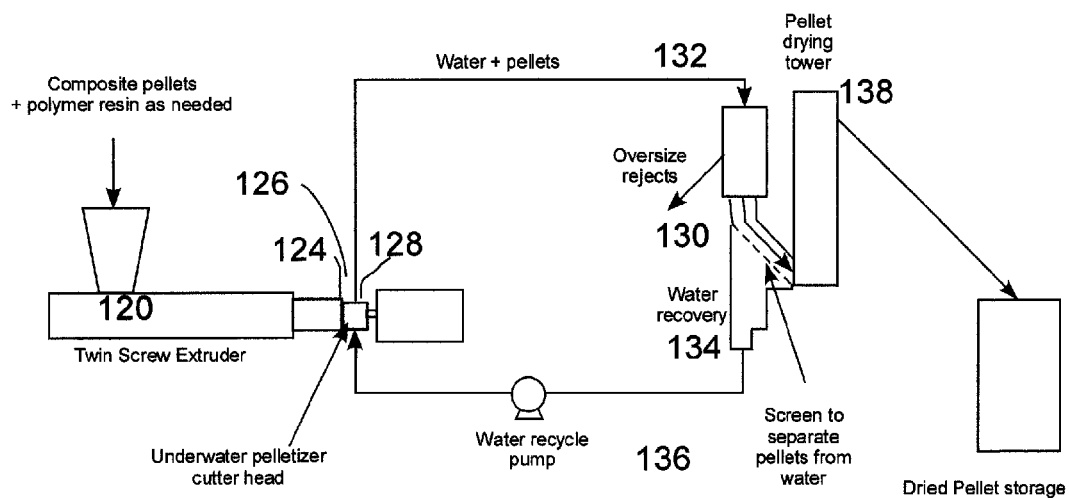
FIG. 15 is a diagram of an underwater pelletizing system.

FIG. 15 is a diagram of an underwater pelletizer. The pellets exit the second twin screw extruder 120 through die apertures 124 in die plate 126 into a cutting chamber 128 in which the extrudate is cut into pellets. The pellets are carried by water from the cutting chamber 128 to a separation section 130 by pipe 132. The hot pellets are cooled by the water. In one embodiment the pellets become spheroid shaped during the process. In the separation section 130 the pellets are separated from the water by filtration. The separated water passes through a heat exchanger 134 in which the water is cooled. The water returns to cutting chamber 128 through pipe 136.

The separated pellets pass through a dryer section 138 in which the rest of the water is removed. A cyclone drier is shown but the drier can be any kind of drier. The dried pellets then pass into a pellet chute and into a bagging operation in which the pellets are bagged.

There are a number of manufacturers of underwater pelletizers. These include Gala Industries, Neoplast, Berlyn and Davis Standard.

An underwater pelletizer has many advantages, but any type of pelletizer may be used.

A melt pump can be used to dampen the pressure and flow pulses generated by the twin screw extruder, thus ensuring continuous and steady supply of extrudate.

FIG. 14 shows another embodiment of the mixing system.

It may be necessary to obtain greater dispersion of the cellulose wood pulp fibers in the polymer. A mixing device such as the single screw extruder shown in FIG. 9 is placed between the two twin screw mixers. The single screw extruder is used to further disperse the fibers.

It should be understood that in the following discussion of the different embodiments of the let-down pellet that any individual pellet may have one or more of each of these embodiments.

In several of the following tests the composite polymer is molded into a dogbone shape having the following dimensions: 6⅜ inches long, ⅛ inch thick, the end sections are ¾ inches wide, the central section is ½ inch wide and length of the central section is 2.7 inches or 68 mm. These are the dimensions of a dogbone when it is mentioned in the text. The molding of the dogbone is under heat and compression. Molding of a master batch pellet with its large amount of fiber causes degradation of the fiber because of the large amount of heat and pressure required to mold the material causing the fiber to turn brown.

In an embodiment a let-down composite having 10 to 50 weight % bleached chemical wood pulp fiber is provided. The remainder is polymer and other additives. In another embodiment a let-down composite is provided which has 20 to 40 weight percent bleached chemical wood pulp fibers and the remainder is polymer and other additives as noted above.

In an embodiment the let-down composite has a brightness of at least 20 as measured by the Brightness Test. In another embodiment the let-down composite has a brightness of at least 30 as measured by the Brightness Test.

The master batch composition, having 65 weight % or more fiber in the composition does not have this brightness because the heat and pressure required to form the material into a dogbone degrades the fiber and causes a brown or black color.

Brightness Test

The method is that a light from a single source is focused and directed through an aperture onto the dogbone at an angle of 45 degrees and the reflected light passes through a filter having standard spectral characteristics and is then measured by a photodetector located perpendicular to the upper surface of the dogbone. The amount of reflected light is compared with magnesium oxide, which has known spectral characteristics which are stored in the instruments memory. The ratio of the reflected light to the magnesium oxide is expressed as a percentage.

The instrument is a Technidyne Brightimeter MICRO S-5. The instrument should be warmed up for 30 minutes prior to testing. The reflected light passes through a filter having an effective wave length of 457 nanometers filter.

One dogbone is tested for each different condition of the composite such as different polymer, different polymer amount, different fiber amount, different additives. There is a 1 kg. weight on top of the dogbone. The dogbone is rotated through the four cardinal compass points, to give four brightness values that are averaged.

In an embodiment or the let-down composite, the average dispersion of bleached chemical wood pulp fibers in the let-down composite is equal to or greater than 90%. In another embodiment of the let-down composite the average dispersion of bleached chemical wood pulp fibers in the let-down composite is equal to or greater than 95%. In another embodiment the average dispersion of bleached chemical wood pulp fibers in the let-down composite is equal to or greater than 98%. In another embodiment the average dispersion of bleached chemical wood pulp fibers in the let-down composite is equal to or greater than 99%. Average dispersion means the fibers are substantially uniformly distributed throughout the composite and the percentage is the number of fibers which are not in flocks. These percentages are determined using the Dispersion Test.

Dispersion Test

Measurement of dispersion is accomplished by using ImageJ (NIH). ImageJ is freeware that can be downloaded at http//imagej.nih gov/ij/download.html. The Erode, Subtract Background, Analyze Particles and the other commands used in the custom macro below are standard commands in ImageJ. The macro simply uses the standard IMageJ commands in a given order to obtain the information.

The samples are dogbones as described above. Xray photographs of the samples are taken and the photographs are scanned to a digital image. The image is opened with ImageJ and the image is analyzed using the custom macro.

The custom macro locates the samples in the image. It then performs the Erode command four times to remove sample edge artifacts. It applies the Subtract Background command with a rolling ball diameter of 5 pixels, a light background and smoothing disabled. The grayscale image is converted to black and white by using a threshold value supplied by the user. A typical threshold value is 241.

The image now has black particles which correspond to undispersed fibers. The particles are counted using the Analyze Particles command All particles except those touching the edge are counted. This is because there are often edge effects that look like a particle to the macro but are not actually a particle.

The other assumption is that the diced wood pulp material provided to the process will divide or delaminate once along a center line and these divided particles may also divide or delaminate once along a center line. The macro assumes that one-half of the analyzed particles will have divided or delaminated once and the other half will have divided or delaminated twice.

The macro reports the area of the undispersed particles. The macro assumes that one-half of the total area is occupied by once divided undispersed particles and one-half of the total area is occupied by twice divided particles.

The total weight of the undispersed particles or fibers is then calculated. In the following discussion a pulp sheet having a basis weight of 750 grams per square meter (gsm) is used. The macro assumes the basis weight of one-half of the particles, the once divided particles, have a basis weight of 375 gsm and the other half of the analyzed particles, the twice divided particles, have a basis weight of 187 gsm. The total weight of the undispersed particles or fibers is determined by the following formula:

Weight undispersed particles=0.0001*[0.5*(area of undispersed particles)cm$^2$*(375 gsm)+0.5*(area of undispersed particles)cm$^2$*(187 gsm)]

The weight percent of undispersed particles is found by the following formula:

Weight % undispersed particles=100*Weight undispersed particles/Total weight of fibers in sample The weight percent of dispersed fibers is found by subtracting the weight percent of undispersed particles from 100 percent.

The actual macro is:

```
//HOW MANY SPECIMENS ARE IN THE IMAGE?
N=10;
//Now run the macro
run("8-bit");
run("Rotate 90 Degrees Right");
run("Select All");
run("Copy");
run("Internal Clipboard");
setThreshold(0,200);
run("Convert to Mask");
k=1;//initialize k to 1
P=4;//number of Erode operations to perform
    while (k<=P) { //this loop does multiple Erodes
    run("Erode");
    k=k+1;
    }
run("Analyze Particles . . . ", "size=0-Infinity circularity=0.00-1.00 show=
Nothing clear record add");
run("Internal Clipboard");
run("Subtract Background . . . ", "rolling=5 light disable");
selectWindow("Clipboard");
run("Create Selection");
selectWindow("Clipboard-1");
run("Restore Selection");
//THE USER MUST SET THE THRESHOLDING VALUE. 241
USUALLY WORKS WELL.
setThreshold(0, 241);
run("Convert to Mask");
run("Make Binary");
k=0;
M=N-1;//we count up from 0 not 1
    while (k<=M) { //this loop does multiple Analyze Particles
    roiManager("Select", k);
    run("Analyze Particles . . . ", "size=0-Infinity circularity=0.00-1.00
    show=Nothing exclude summarize");
    k=k+1;
    }
close( );
close( );
```

Dispersion can depend on the amount of fiber loading. In an embodiment of the composite having 20 weight % bleached chemical wood pulp fiber the dispersion was found to be equal to or greater than 99%. In an embodiment of the composite having 30 weight % bleached chemical wood pulp fiber the dispersion was found to be equal to or greater than 98%. In an embodiment of the composite having 40 weight % bleached chemical wood pulp fiber the dispersion was found to be equal to or greater than 92%.

The odor level of the let-down composite was compared to the odor levels of the thermoplastic polymer which incorporated other materials. Three levels of let-down composite were tested—polymer incorporating 20 weight % bleached chemical wood pulp fiber, incorporating 30 weight % bleached chemical wood pulp fiber and incorporating 40 weight % bleached chemical wood pulp fiber. These were compared to a control of the thermoplastic polymer alone, with the polymer incorporating 30 weight % glass fiber, with the polymer incorporating 30 weight % sisal and with the polymer incorporating 30 weight % maple wood flour.

The test used was ASTM E679, using an Ac'scent olfactometer, available from St. Croix Sensory, 1-800-879-9231. In this test the sample is placed in a 9 L Tedlar bag at 40° C. for 24 hrs prior to testing. The olfactometer uses a venture valve system where odor free air at high flow rate through the valve pulls air from the sample bag into the air stream. Dilution factors from 8 to 66,000 can be achieved. The reported number is the dilution factor at which sample odor was detected.

The higher the dilution number the more odiferous is the material. The results are as follows:

| Material | Dilution to detection of odor |
| --- | --- |
| Control | 150 |
| 30% glass fiber | 470 |
| 30% sisal fiber | 7200 |
| 30% maple wood flour | 1500 |
| 20% bleached wood pulp fiber | 350 |
| 30% bleached wood pulp fiber | 300 |
| 40% bleached wood pulp fiber | 330 |

It can be seen that the dilution level of the thermoplastic polymer with bleached chemical wood pulp fiber is less than any of the other materials, including glass fiber, and is substantially the same regardless of the amount of wood pulp fiber incorporated into the thermoplastic polymer.

In order to determine the usefulness of the let-down composite a Moldflow® report of the let-down pellets was commissioned. Moldflow® reports are used in the industry to determine how to cycle material through a molding process, and to gain insight into the behavior of a material during the injection molding process. The report compared a polypropylene composite with 30% bleached chemical wood pulp fibers with two 20% glass filled polypropylene composites.

The following table from the report provides a cooling time study for a heavy duty part. The runners are the channel leading to the mold which can be run hot or cold. If cold then it has to be ejected with the part, trimmed off and recycled or discarded as waste. If hot, the contents stay molten and are used as the first bit of injected plastic for the next injection cycle.

| Composite type | Melt temperature ° F. | Runner | Cooling time to reach ejection temperature Seconds |
| --- | --- | --- | --- |
| 20% glass filled polypropylene | 380 | Hot | 136 |
| | 380 | Cold | 124 |
| | 446 | Hot | 180 |
| | 446 | Cold | 180 |
| 20% glass filled polypropylene | 380 | Hot | 126 |
| | 380 | Cold | 126 |
| | 446 | Hot | 183 |
| | 446 | Cold | 184 |
| 30% wood pulp fiber filled polypropylene | 330 | Hot | 99 |
| | 380 | Cold | 106 |
| | 380 | Hot | 105 |
| | 446 | Cold | 119 |

It can be see that the bleached chemical wood pulp fiber filled polypropylene had a much shorter cooling time than the glass filled polypropylene. This translates into faster cycle times and more parts produced in a given period of time.

This is also shown in another table from the report which compares generic "average" cycle times for molded parts for the 20% glass filled polypropylene material and the 30% bleached chemical wood pulp fiber filled polypropylene material.

| Process step | 20% glass filled polypropylene material | 30% bleached chemical wood pulp fiber filled polypropylene material |
| --- | --- | --- |
| Filling time, seconds | 3 | 3 |
| Pack/Hold time, seconds | 12 | 10 |
| Cooling time, seconds | 39 | 26 |
| Mold open/close, seconds | 6 | 6 |
| Total cycle time, seconds | 60 | 45 |

The generic "average" cycle time for the material filled with chemical wood pulp fibers is 75% of the cycle time for the glass filled material. This provides a much faster production rate.

It is also noted that the composition with 10 to 50 weight % wood pulp fiber and 25 to 85 weight % thermoplastic polymer has another attribute. The edges of molded structures are free or substantially free of tactile defects. A tactile defect is a defect that can be felt when moving a hand or finger along the edge of the molded part. A tactile defect should be distinguished from a visual defect. It is possible for a part to have a visual edge defect, one that can be seen, but not have a tactile edge defect, one that can be felt. The edge of a part is the boundary layer between the two faces of the part. It is usually rounded or at an angle to the faces of the part. It is often rounded or at a 90° angle to the faces of the part. In one embodiment the edges would be tactile defect free. In another embodiment the edge would average one tactile defect or less per foot or less of edge. In another embodiment the edge would average two tactile defects or less per foot or less of edge. The term "foot or less" means that if the total edge length is less than an exact number of feet then the total edge length will be treated as being the next largest foot length for the determination of tactile defects. For example if the structure has a total edge length of 8 inches then it would be treated as having a total edge length of 1 foot for determining the number of tactile defects, and if the total edge length is 2 foot 4 inches then it would be treated as having a total edge length of 3 feet in determining the number of tactile defects.

The master batch pellet containing 65 to 85 weight percent fiber may also be let down to 10 to 50 weight percent fiber or 20 to 40 weight percent fiber in the injection molding operation for forming molded parts. The pellet is added to the injection molder and the additional thermoplastic polymer needed to reduce the amount of fiber to 10 to 50 weight percent fiber or 20 to 40 weight % fiber is added to the injection molder. The polymer is let down to the final fiber amount and the molded part is formed at the same time. This reduces the expense of reducing the amount of fiber as a separate operation.

While illustrative embodiments have been illustrated and described, it will be appreciated that various changes can be made therein without departing from the spirit and scope of the claimed subject matter.

The invention claimed is:

1. A composition consisting of 10 to 50 weight % bleached chemical wood pulp fiber, 45 to 85 weight % thermoplastic polymer, and 0.5 to 20 weight % additives, in which the fibers are dispersed throughout the composition in substantially individual form;
   wherein the additives consist of one or more compatibilizers, coupling agents, anti-oxidants, and lubricants;
   wherein the thermoplastic polymer is selected from the group consisting of polyolefins, polyethylene, high density polyethylene, low density polyethylene, linear low density polyethylene, polypropylene, polystyrene, polystyrene copolymers, styrene block copolymers, potyvinyl chloride, and the aforementioned polymers in the form of recycled plastics; and wherein the average dispersion of the substantially individual fibers is equal to or greater than 90% as determined by the Dispersion Test.

2. The composition of claim 1, consisting of 20 to 40 weight % bleached chemical wood pulp fiber, 45 to 75 weight % thermoplastic polymer, and 0.5 to 20 weight % additives.

3. The composition of claim 1, wherein the average dispersion of the substantially individual fibers is equal to or greater than 95% as determined by the Dispersion Test.

4. The composition of claim 3, consisting of 20 to 40 weight % bleached chemical wood pulp fiber, 45 to 75 weight % thermoplastic polymer, and 0.5 to 20 weight % additives.

5. The composition of claim 1, wherein the average dispersion of the substantially individual fibers is equal to or greater than 98% as determined by the Dispersion Test.

6. The composition of claim 5, consisting of 20 to 40 weight % bleached chemical wood pulp fiber, 45 to 75 weight % thermoplastic polymer, and 0.5 to 20 weight % additives.

7. The composition of claim 1,
wherein the thermoplastic polymer comprises a polyolefin.
wherein the composition comprises a compatibilizer, and
wherein the compatibilizer includes a polyolefin-graft-maleic anhydride copolymer.

8. The composition of claim 1, wherein the bleached chemical wood pulp fiber and thermoplastic polymer collectively make up at least 85 weight % of the composition.

9. The composition of claim 1, wherein the bleached chemical wood pulp fiber and thermoplastic polymer collectively make up at least 90 weight % of the composition.

* * * * *